United States Patent [19]
Greaney

[11] 3,889,120
[45] June 10, 1975

[54] METHOD AND APPARATUS FOR DETERMINING FLOW CHARACTERISTICS IN A PIPELINE OR THE LIKE

[76] Inventor: John E. Greaney, 18610 Cape Charles Ln., Houston, Tex. 77058

[22] Filed: Jan. 26, 1973

[21] Appl. No.: 327,017

Related U.S. Application Data

[63] Continuation-in-part of Ser. No. 149,957, June 4, 1971, Pat. No. 3,766,388.

[52] U.S. Cl. ................. 250/356; 250/308; 250/432
[51] Int. Cl. .............................................. G01t 1/00
[58] Field of Search ............ 250/260, 308, 356, 432

[56] References Cited
UNITED STATES PATENTS

| | | | |
|---|---|---|---|
| 2,385,378 | 9/1945 | Piety | 250/260 |
| 2,617,941 | 11/1952 | Craggs | 250/260 |
| 2,826,699 | 3/1958 | Hull | 260/356 |
| 2,841,713 | 7/1958 | Howard | 250/356 |
| 3,576,998 | 5/1971 | Deutsch | 250/432 |

Primary Examiner—James W. Lawrence
Assistant Examiner—Harold A. Dixon

[57] ABSTRACT

A method and apparatus is provided which employs a long-lived radioactive isotope, which is in ion exchange relationship with a solid non-radioactive material, but which decays to form a short-lived daughter product not in ion exchange relationship with the non-radioactive material. An acid or other solvent is flushed over the solid material to dissolve away only the daughter product, and the resulting effluent may be injected into the pipeline to form a tracer which may be detected downstream at one or more preselected locations outside the pipeline. The detectors are preferably those generating a pulse for each detected radiation, and thus a time-dependent count may be made of such pulses to determine the first arrival of the injected effluent or marker for purposes of greater accuracy.

13 Claims, 4 Drawing Figures

METHOD AND APPARATUS FOR DETERMINING FLOW CHARACTERISTICS IN A PIPELINE OR THE LIKE

This is a continuation-in-part of the co-pending patent application Ser. No. 149,957, filed June 4, 1971, which issued as U.S. Pat. No. 3,766,388, on Oct. 16, 1973.

BACKGROUND OF INVENTION

This invention relates to methods and apparatus for measuring fluid flow characteristics and, more particularly, relates to improved methods and apparatus for measuring fluid flow rate and velocity in a pipeline and the like.

There are many different methods and apparatus available for measuring the velocity and flow rate of a fluid passing along a pipeline. Although such methods and apparatus are widely used, each is subject to various disadvantages which seriously limit the accuracy of the measurements they purport to provide. This is principally due to the fact that such devices actually do not measure flow velocity or rate as such but instead measure only a related system parameter.

In one widely used type of measuring device, the fluid in the pipeline is passed through an orifice of predetermined size while the pressure on each side of the orifice is monitored. Thus, flow rate is determined in this instance as a function of the size of the conducting pipe and the differential between the two pressures. It will be apparent, however, that although flow rate through the pipeline is a substantially linear function of the size of the orifice, the pressure differential across the orifice is only linear within a relatively limited range of pressures.

In another type of conventional measuring equipment, a turbine or the like is disposed in the pipeline for rotation by the fluids flowing therein, and flow velocity and rate is determined as a function of the rotation of the turbine. The disadvantage of such a device derives from the fact that fluid flow through the pipeline is non-linear in character except within relatively narrow limits, whereas rotation of the turbine is entirely linear. A further cause for inaccuracy arises out of the fact that, in a turbine-motivated meter, fluid flow is first translated into mechanical rotation, and then the rotation of the turbine is translated into a recordable indication, and it is axiomatic that there is an inherent loss of accuracy at each stage of translation.

In order to overcome the disadvantages of the more conventional measuring techniques and devices, it has been proposed to inject a discrete quantity or "slug" of radioactive tracer material into the pipeline at one preselected location and then to detect the slug as it travels past a second predetermined location. The time interval subsisting between the moment of injection and the moment of detection will, of course, provide a direct basis for computing both the flow velocity and the flow rate of the material in the pipeline as a function of the internal cross section of the pipeline.

Although such a technique has the obvious advantage of deriving a measurement directly from the movement of the pipeline fluid sought to be observed, it is also subject to many disadvantages which combine to make it unacceptable for most applications. In the first place, the radioactive tracer material is extremely difficult if not impossible to remove from the fluid in the pipeline. Thus, the technique usually cannot be used in pipelines carrying natural gas and the like to homes and business establishments.

It has been proposed to overcome this disadvantage by using only a tracer material composed of an isotope having a relatively short half-life, whereby the tracer will decay away as soon as possible after the measurement has been made. This proposal is usually impractical, however, since in most instances the measurements are necessarily made at a considerable distance from the point of origin of the tracer material, and any isotope capable of being retained for any appreciable period without significant loss of strength will necessarily be one having a relatively long half-life.

It is well known, of course, that there are long-lived unstable isotopes which decay to form other unstable isotopes having relatively short half-lives. Accordingly, it has been proposed to carry a long-lived isotope to the site of the measurement and thereafter to employ only the short-lived daughter product as the tracer. The problem with this proposal is that the two isotopes are completely intermixed, and, if the daughter product must be separated at the measurement site, this necessitates a substantial amount of handling of a dangerous material under less than optimum conditions.

Even when provisions are made to overcome or minimize the principal problems attending the use of a tracer for these purposes, it should be clearly understood that there are many other secondary problems with this technique. In the first place, it is essential to the purposes of the process that the tracer be in the form of a discrete quantity or slug when it arrives at the detection site, so that the portion of the pipeline fluid containing the tracer is clearly observable. Thus, it is essential that the tracer be initially injected into the pipeline in a manner such that the tracer is not subject to premature diffusion, and this is extremely difficult to accomplish against internal pipeline pressures which are usually on the order of 100–125 psig or greater, since it requires that the tracer be released at a point on the longitudinal axis of the pipe.

These disadvantages of the prior art are overcome with the present invention, however, and novel methods and apparatus are herewith provided for making a tracer measurement of the velocity and/or flow rate of the material being carried in a pipeline.

SUMMARY OF INVENTION

In an ideal form of the present invention, injection apparatus is provided for selecting and introducing a discrete quantity of a short-lived tracer material into the pipeline at a preselected location along its axial center and for detecting and indicating the first arrival of the resulting slug at two or more preselected downstream locations along said pipeline, whereby the flow velocity and/or rate of such material between such detection locations may be determined in digital form.

In particular, the pipeline is preferably provided with a tee-connection or section at the injection location and with a gate valve or the like mounted on the end of the stub or shank of the tee-connection. The gate valve may be of conventional design whereby it will isolate the interior of the pipeline from the ambient atmosphere whenever it is closed. Accordingly, the valve body is preferably provided with an access port which is located on its opposite side and in line with the longitudinal axis or center line of the main body of the pipeline, and which is capable of slidably receiving a cylindrical body of suitable configuration in a gas-tight manner.

The cylindrical body, of course, is the apparatus for injecting the tracer material into the fluid which is flowing in the pipeline. In this instance, however, the injection apparatus is composed of a tube-like member adapted to contain the tracer material, and which is long enough to extend through the gate valve (when it is open) to the axial center of the pipeline. Thus, the tube-like member is preferably provided with an internal piston or plunger-like member located within a chamber portion adapted to hold a preselected quantity of tracer and means for abruptly plunging the piston into this chamber portion to eject the tracer out through a suitable discharge port at the end of the tubular member.

The advantages of the present invention may conveniently be attained with the use of a tracer which is a short-lived daughter product separated from a long-lived unstable isotope only at the moment it is to be injected into the pipeline, and wherein separation is performed without the extensive handling which is necessary with the techniques of the prior art. Accordingly, the main tubular body of the present injection apparatus is preferably provided with an auxiliary chamber located at its far end and adapted to slidably contain a second piston or plunger member. Further, a hollow porous member or "frit" is located in the auxiliary chamber between the second plunger and the main interior portion of the tubular body and containing a quantity of a suitable resin which has been impregnated with the particular long-lived isotope selected for this purpose. The auxiliary chamber is thus filled with a suitable solvent which is incapable of separating the long-lived parent isotope from the resin in the porous frit, but which is fully capable of easily dissolving the daughter product and conducting it out of the porous frit.

Referring again to the ideal concept of the present invention, the apparatus will preferably include a first scintillation counter of conventional design mounted against the exterior surface of the pipeline at a first preselected downstream location and a second such scintillation counter similarly located at a second downstream detection site. Each scintillation counter is preferably connected to deliver its output pulses to a differential discriminator preferably set to acknowledge only pulses with amplitudes corresponding generally to the energies of the radiations emitted by the tracer material. Each discriminator, in turn, is preferably connected to apparatus for registering only a pulse count rate which exceeds a preselected minimum in order that the apparatus can ignore spurious signals. Finally, timing means is preferably included for determining the time required for the slug to travel from the first detection site to the second, and means for deriving flow velocity and/or rate from the time determination.

Apparatus of the foregoing design is not only simple to operate without special hazard to either persons or property, but is also capable of making a repetition of such measurements within a relatively brief interval. Most pipelines are conventionally provided with a tee-joint and gate valve, or the equivalent thereto, and thus all that is required to install the apparatus of the present invention is to first position the detectors or scintillation counters at the appropriate detection spots, and then to insert the main tubular body of the injection assembly slidably through the access port in the body of the gate valve until it abuts the valve shutter or closure member. The valve is then opened, and the tubular body may then be further slidably inserted through the access port until its discharge port is at the coaxial center of the pipeline.

When a measurement is to be made, the operator first actuates the second plunger in the injection assembly to drive a discrete quantity of the solvent through the frit and into the auxiliary chamber portion of the main tubular body, whereby an appropriate quantity of daughter product is separated from the parent isotope in the frit and conducted out of the aforementioned chamber to the bottom of the main tubular body. The first plunger is then actuated to expel the tracer from the bottom of the main tubular body and into the pipeline at precisely its center axis. After the slug has been observed by the two detectors, and the timing measurement has been taken, the first plunger can be withdrawn from the chamber portion of the main tubular body, and the second plunger can be actuated again to redeposit tracer into the chamber in the main tubular body. Then, the first plunger can be driven into the chamber to repeat the process without further preparation or handling of the apparatus or the tracer.

These and other features and advantages of the present invention will become more apparent from the following detailed description, wherein reference is made to the figures in the accompanying drawings.

IN THE DRAWINGS

DETAILED DESCRIPTION

Figure 1:
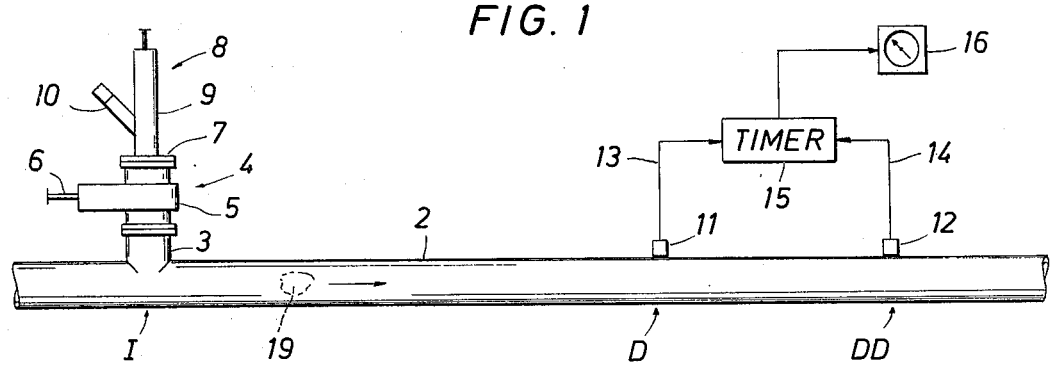
FIG. 1 is a simplified functional representation of apparatus interconnected with a conventional pipeline for practicing the concepts of the present invention.

Referring now to FIG. 1, there may be seen a simplified representation of a section of a conventional pipeline 2 arranged to conduct a fluid such as natural gas under a relatively high pressure and further having an offset stub 3 preferably having a conventional flange means. Accordingly, a suitable gate valve 4 or the like may be conveniently bolted to the flanged end of the stub 3 for opening and closing it as desired.

As hereinbefore indicated, it is an object or feature of the present invention to inject or deposit a discrete quantity of a selected radioactive isotope through the valve 4 and stub 3, and into the pipeline 2 at or adjacent its axial center. Accordingly, a suitable injection assembly 8 is provided which, as will hereinafter be described in detail, is preferably composed of a tubular housing 9 which is slidably but gas-tightly disposed in a suitable fitting 7 which closes the opposite end or side of the valve 4. As will be further explained in detail, the injection assembly is additionally provided with a generator section 10 by which a discrete amount of a suitable short-lived isotope may, upon demand, be drawn from a long-lived isotope and dispensed from the lower end of the housing 9 at the intersection of the axes of the stub 3 and the pipeline 2 at a location hereinafter referred to as point I along the pipeline 2. Accordingly, it is this discrete quantity of short-lived tracer material which functions as the marker 19 and which is to be carried downstream in the pipeline 2 by the gas therein.

Referring again to FIG. 1, it may be seen that the apparatus depicted therein will include a radiation detector 11 mounted on or adjacent the outside surface of the pipeline 2, at a preselected location hereinafter referred to as point D, and of a design suitable for sensing radiations emanating from the marker 19. In addition, there will preferably be provided at least one other such detector similarly located at a second preselected downstream location hereinafter referred to as point DD on the pipeline 2. Accordingly, the first detector 11 will generate a suitable signal 13 to indicate the arrival of the marker 19 at point D in the pipeline 2, and the second detector 12 will thereafter generate a suitable signal 14 to indicate the subsequent arrival of the marker 19 at point DD. The two signals 13 and 14 may thus be utilized by a suitable timer 15 and other circuitry to provide a determination of the velocity of the marker 19 traveling in the pipeline 2 between points D and DD, and perhaps the flow rate of the gas traveling therebetween, and such determination may be either recorded and/or visually displayed by any suitable recording means 16 of conventional design.

It is within the scope of the present invention to coordinate the timer circuitry 15 with the operation of the injection assembly 8, of course, and to make a velocity determination on the basis of the distance along the pipeline 2 between points I and either D or DD, or both. As will hereinafter be explained, however, it is essential to the accuracy of any velocity determination being made on the basis of detection of radiations from the marker 19 that all measurements be preferably made on the basis of the first arrival of the marker 19 at either or both of the detection points D and DD. This, in turn, depends to a considerable extent on the shape of the material constituting the marker 19 being sustantially the same as it passes both detection points D and DD. Accordingly, for this as well as other reasons which will hereinafter become apparent, it is preferable that all measurements be made on the basis of travel of the marker 19 between the detection points D and DD, rather than travel from the initiation point I to either or both detection points D and DD.

Figure 2:
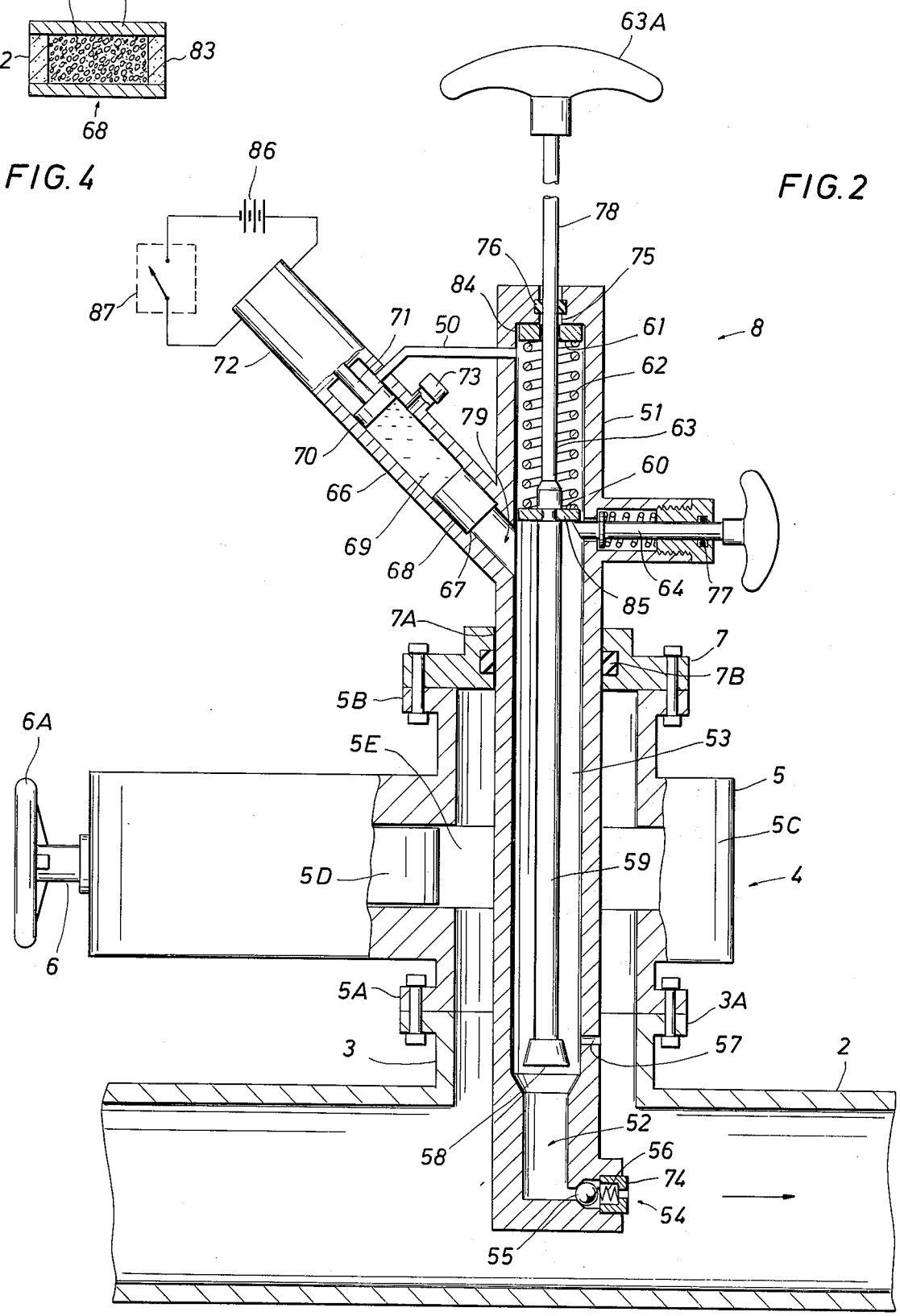
FIG. 2 is a simplified pictorial representation, partly in cross-section, of one form of injection apparatus suitable for use in practicing the concepts of the present invention.

Referring now to FIG. 2, there may be seen a simplified but more detailed pictorial representation, partly in cross section, of the stub 3, gate valve 4, and apparatus which may be used as the injection assembly 8 hereinbefore referred to with respect to FIG. 1. In particular, the stub 3 may be seen to be preferably located on the side of the pipeline 2 so as to extend vertically upward therefrom at a 90° angle relative to the pipeline 2 and to be provided with a suitable flange 3A of conventional design. The pipeline 2 will normally operate independently of the action, and even the presence of the injection assembly 8, and thus suitable means are preferably provided for closing the upper end of the stub 3 at all times. Accordingly, and as hereinbefore stated, there is preferably provided a gate valve 5 of conventional design which has its flanged outlet side 5A bolted or otherwise secured in a gas-tight manner to the flange 3A on the stub 3. Thus, the pipeline 2 may be closed at any desired time by rotation of the control wheel 6A in a direction such as to drive the stem 6 and closure member or flap into seating engagement with the seat portion 5C (suggested but not specifically depicted in FIG. 2) of the valve body 5.

Referring again to FIG. 2, it will be seen that the injection assembly 8 is of a configuration such as to be capable of being inserted through the intake side 5B of the valve 4, and down through the open valve 4 and stub 3 so that its lower end is positioned at or adjacent the center of the pipeline 2. Since this must be arranged without loss of operating pressure in the pipeline 2, the upper flanged intake side 5B of the valve body 5 is preferably closed with a flange-like fitting 7 having a central aperture 7A for slidably receiving the injector housing 51, and further preferably having a suitable gland 7B or other conventional means for providing a gas-tight seal between the ambient atmosphere and the pipeline pressure within the passageway 5E in the valve 4. Thus, the injector housing 51 may be slidably fitted through the gland 7B and aperture 7A in the fitting 7 until the lower end of the housing 51 is above the flap 5D, and the valve 5 may then be closed whenever it is desired to remove the injector assembly 8 for recharging purposes. As will hereinafter be apparent, however, the injector assembly 8 depicted in FIG. 2 will rarely need replenishing of the radioactive material which provides the source of tracer or marker 19 hereinbefore described.

As previously indicated, the housing 51 of the injector assembly 8 is principally composed of a tubular body having an interior cross section of one uniform size along most of its length to provide an R/A feed channel 53, and having a cylindrical interior of somewhat smaller cross section or diameter at or within its lower end to form a reservoir 52. In addition, the lower end of the housing 51 is preferably ell-shaped with a discharge port 54 communicating with the interior of the pipeline 2 and directed downstream along its longitudinal axis. The pressure within the housing 51 is preferably the same as that within the pipeline 2, and this is accomplished by means of a pressure equalization port 57 preferably located in the wall of the housing 51 above the reservoir 52 therein. However, the outlet or discharge port 54 in the lower end of the housing 51 is preferably closed by an orifice insert 74 which supports a ball 55 and spring 56 in a manner to close the discharge port 54 whenever the pressure in the reservoir 52 is equal or less than the operating pressure in the pipeline 2.

Referring again to FIG. 2, the upper end of the housing 51 is provided with another aperture 75 and gland 76 of conventional design for gas-tightly but slidably receiving the shaft portion 63 of an actuating assembly 78 having a suitable handle 63A at its upper end, and further having a plunger 58 mounted on the lower end of a plunger rod 59 which extends down through the feed channel 53 in the housing 51 from the lower end of the shaft 63. The plunger 58 may be of any suitable material which is both acid-resistant and resilient in character, and is preferably frusto conical in configuration and size, whereby it will tend to exert a compressive force when driven downwardly through the reservoir 52 in the housing 51.

A normally distended coil-type spring 62 is preferably disposed axially about the shaft 63 of the actuating assembly 78 and between an upper spring retainer 84 which is preferably fixedly located in the upper end of the housing 51 and slidably about the shaft 63, and a lower spring retainer 85 which is preferably secured to the upper end of the plunger rod 59. In addition, a packer 77 of suitable configuration may either be slidably disposed about the plunger rod 59 and fixed to the inside surface of the housing 51 at a point above the junction between the housing 51 and its tracer tube section 66, or it may be slidably disposed in the housing 51 and linked to the plunger rod 59 at a point such that it cannot travel above the slot 65 or below the outlet end 79 of the tracer tube section 66.

It will be apparent that when the plunger rod 59 is raised through the housing 51 a distance such that the plunger 58 clears the reservoir 52, the lower spring retainer 85 will also be raised to compress the spring 62 against the upper spring retainer 84. In addition, the lower spring retainer 85 may then be secured in this condition by a release member 64 which, as may be seen in FIG. 2, is pivotally secured in the slot 65. When the release pin 64 is tripped, however, the spring 62 will drive the lower spring retainer 85 downward through the R/A feed channel 53 until the plunger 58 is driven through the reservoir 52 to the bottom of the housing 51.

Referring again to FIG. 2, it may be seen that the tracer tube section 66 of the injection assembly 8 has an interior shoulder portion 67 for supporting a frit 68 against being driven into the interior of the housing 51, and a fill cock 73 or other conventional means for conducting an acid or other suitable solvent into the chamber 69 provided by the space between the frit 68 and a piston 70 mounted on the free traveling end of a piston shaft 71. In addition, a pressure-equalization tube 50 is preferably provided between the upper end of the injector housing 51 and the back side of the piston 70.

Figure 4:
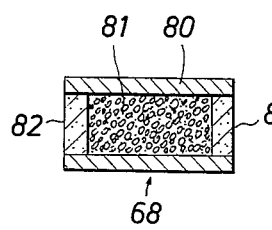
FIG. 4 is a simplified pictorial representation, partly in cross section, of one embodiment of a particular portion of the apparatus depicted in FIG. 2.

Referring now to FIG. 4, there may be seen a more detailed representation of the frit 68 which is only generally represented in FIG. 2. In particular, the frit 68 may be composed of a tubular or cylindrical body 80 preferably formed of a solvent-resistant material such as stainless steel, and containing granules or other particles of a suitable cation exchange resin 81 which has been saturated or otherwise impregnated with an unstable isotope of a character suitable for purposes of this invention. The body 80 may be either permeable or impermeable to a liquid, but the end stoppers or plugs 82 and 83, which are provided for the purpose of retaining the granules of cation exchange resin 81 in the body 80 are preferably porous in character but also formed of a solvent-resistant material.

The unstable isotope with which the resin 81 is impregnated is preferably a soluble one which not only has a relatively long half-life, but which also decays to form a soluble daughter product having a relatively short half-life. The particular isotope which is most useful for the subject invention will depend at least partially upon the environment and other circumstances under which the invention is practiced. For example, an isotope having a half-life of months or years will permit the invention to be practiced in situ with little or no maintenance. As will hereinafter be apparent, the half-life of the daughter product must be long enough to have a detectable existence at point DD on the pipeline 2, but short enough whereby it decays to stable form within a reasonably short time after passing point DD, and thus the isotope chosen for impregnation of the granules of resin 81 will be selected with regard to the spacing between points I and DD and the velocity of the material traveling in the pipeline 2.

Notwithstanding these and other factors, however, the most important feature of this invention is that the materials chosen as the resin 81 and impregnating isotope must be such that the selected isotope will enter into as complete an ion exchange relationship with the resin 81 as is possible, but that the daughter product which is generated by decay of the parent isotope is simultaneously incapable of such relationship.

A parent isotope, which has been found to be particularly suitable for present purposes, is the isotope cesium-137, since this material has a half-life of approximately 30 years and since it decays to form the daughter product barium-137M which, in turn, has a half-life of only about 2.6 minutes. Furthermore, and of particular importance when the subject invention is needed to be operated repetitively, cesium-137 produces a significant quantity of daughter product within about 6–8 minutes or less, depending upon the volume of parent isotope originally disposed in the body 80 of the frit 68.

Other parent isotopes may be used for purposes of the present invention. For example, the parent isotope may be tin-113, which has a half-life of 115 days, and which produces indium-113M having a half-life of about 100 minutes. Alternatively, the parent isotope may be germanium-68 which has a half-life of 275 days, or cesium-144 having a 285-day half-life may be used for purposes of the present invention.

Insofar as the material which is selected as the resin 81 is concerned, it is of particular concern that the resin 81 be such that a maximum ion exchange be achieved with the parent isotope. It is also desirable that there by a minimum ion exchange rate insofar as the daughter product is concerned, since this factor affects the quantity of tracer material which may be dispensed from the discharge port 54 to form the marker 19. This is less important than maximizing the rate of ion exchange between the parent isotope and the resin 81, however, since it is an essential feature of the present invention that little or no parent isotope be released into the pipeline 2.

Regarding the material used as the resin 81 for these purposes, it has been found that a certain zirconium phosphate resin which is presently manufactured and sold by Bio-Rad Laboratories, of Richmond, Calif., and which is commonly identifed by the trademark ZP-1, is generally suitable for such purposes, notwithstanding that substantially less than total ion exchange is achieved with this material. On the other hand, the preferred material for present purposes is either potassium or ammonium hexacyanocobalt ferrate, inasmuch as a resin material of such composition has been determined to achieve maximum attachment with cesium and minimum attachment for barium.

As hereinbefore stated, the resin 81 in the frit 68 is preferably granular in form. The particular size of the average granule is not a particular feature of the present invention, although it will be apparent that smaller granules will effect a better ion exchange than will larger granules, and a convenient size has been found to be 50–100 microns in diameter. In any event, it will be apparent that the end plugs 82 and 83, although porous, must also have a mesh which is smaller than the smallest granule of resin 81 in the frit 68, to prevent escape of any of the parent isotope into the pipeline 2.

Referring again to FIG. 2, it will be seen that the chamber 69 between the frit 68 and the piston 70, is preferably filled with a suitable reagent such as hydrochloric acid. Any acid or solvent may be employed for present purposes, of course, which is capable of dissolving the daughter product in the frit 68 without significant damage to either the resin 81, the plugs 82 and 83, the jacket or cylindrical body 80 of the frit 68, or the other surfaces and portions of the injection assembly 8.

Referring again to FIG. 2, it will be noted that the opposite end of the rod 71 is connected in a suitable manner to solenoid actuator 72, which may be of any conventional design, and which is preferably energized by a power supply 86 to drive the rod 71 and piston a limited predetermined distance through the tracer tube member 66, and toward the frit 68, when the switch 87 is closed. When this occurs, of course, a limited amount of such acid or other reagent will be flushed through the porous plugs 82 and 83 and will carry whatever daughter product may have accumulated within the frit 68 out through the channel 79 and into the so-called R/A feed channel 53 which extends downward to the reservoir 52 in the lower end of the injector housing 51.

If the injection assembly 8 has been positioned in a substantially vertical manner, as hereinbefore recommended and as illustrated in FIGS. 1 and 2, gravity will carry the liquid tracer material into the bottom of the reservoir 52. It will be further noted, however, that the discharge port 54 is closed with an orifice member 74 or other suitable fitting of annular configuration capable of supporting a ball member 55 and check spring 56. Since the spring 56 normally positions the ball member 55 so as to stopper the aperture in the orifice member 74, the accumulated liquid daughter product or tracer will be retained in the bottom of the reservoir 52.

Referring now to the upper portion of the injection assembly 8, it will be noted that the upper end of the shaft 63 may extend slidably but gas-tightly upwardly through a suitable packing gland 76 mounted in the upper end of the injector housing 51, and may also be provided with a handle 63A of suitable configuration. In addition, there may be a spirng 62 of suitable configuration disposed about the shaft 63 and mounted between the lower surface 61 of an upper spring retainer 84, which is slidably disposed about the shaft 63, and the upper surface 60 of a lower spring retainer 85 which is fixedly mounted on the shaft 63.

When a marker 19 is sought to be created in the pipeline 2, the shaft 63 and plunger rod 59 is first raised by means of the handle 63A, until the plunger 58 is lifted free of the reservoir 52, and until the channel 79 downstream of the frit 68 is open into the R/A feed channel 53 leading into the reservoir 52. Accordingly, the injection assembly 8 is also preferably provided with suitable means for retaining the plunger rod 59 in this position, such as a pin which is slidably but gas-tightly inserted through a gland or other packer 77, and which is normally spring loaded into the interior of the injector housing 51 at a suitable location to engage the lower surface of the lower spring retainer 85. The switch 87 may now be closed to drive the piston 70 a preselected distance towards the frit 68 to cause an appropriate quantity of reagent to flush the accumulated daughter product into the angularly arranged channel 79. After the daughter product or liquid tracer has accumulated in the bottom of the reservoir 52, the pin 64 may be drawn from beneath the lower spring retainer 85, and the compressed spring 62 will then drive the shaft 63 and plunger rod 59 down through the injector housing 51. This, in turn, drives the plunger 58 into and through the reservoir 52 to create a pressure therein which is capable of overcoming the spring 56 and thereby unseating the ball member 55, whereby the daughter product accumulated in the bottom of the reservoir 52 is ejected through the discharge port 54 to form the marker 19 in the pipeline 2.

The operation may be repeated, of course, by merely raising the shaft 63 until the spring-loaded pin 64 again engages the lower surface of the lower spring means 85. However, an interval of sufficient duration should elapse before the switch 87 is again closed, in order that a sufficient quantity of daughter product may accumulated in the frit 68.

Figure 3:
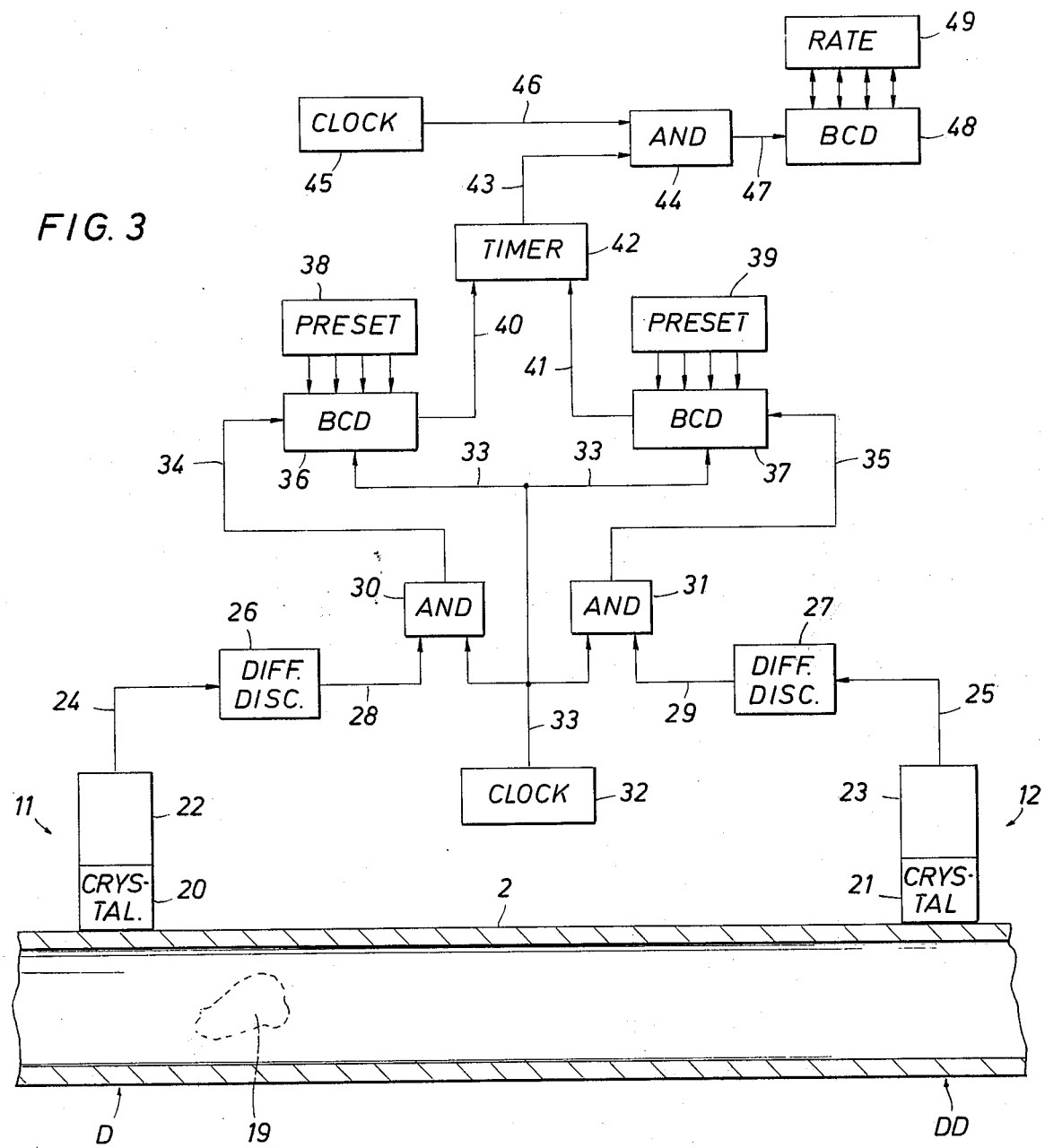
FIG. 3 is a simplified functional representation of one form of detection and measurement apparatus suitable for use with the apparatus illustrated in FIG. 2 in practicing the concepts of the present invention.

Referring now to FIG. 3, it will be seen that the first detector 11, which is shown in FIG. 1 to be located at point D and the pipeline 2, may be a scintillation counter of conventional design and composed of a photomultiplier tube 22 adapted to produce a signal 24 composed of electric pulses functionally representative of gamma rays emanating from the marker 19 and captured by a suitable phosphor or crystal 20. Similarly, the second detector 12 may also be a conventional scintillation counter composed of a photomultiplier tube 23 adapted to generate an output signal 25 which, in turn, is composed of electrical pulses functionally representative of gamma rays emanating from the marker 19 (or from any other source, of course) and captured by a second crystal 21. The timing and other circuitry 15 depicted in FIG. 1 may, as illustrated in FIG. 2, include a differential discriminator 26 of conventional design for eliminating those pulses in signal 24 having amplitudes either above or below a set of preselected trigger levels, and a similar differential discriminator 27 for eliminating those pulses in signal 25 having amplitudes either greater or less than a similar set of trigger levels.

The marker 19 is composed of a daughter product which emits a known class of radiation such as gamma rays having a known range of relatively low initial energies. These radiations must, of course, travel through the gas or other material in the pipeline 2, and through the wall of the pipeline 2 as well, before they can reach the crystals 20 and 21. Many of these radiations will be slowed by one or more Compton scattering reactions, and others will engage in one or more photoelectric absorption reactions before they can be detected. Thus, many of the radiations will never reach the crystals 20 and 21, and a substantial number which are detected will have widely differing terminal energies. Nevertheless, if the marker 19 is sufficiently large, an adequate number of the radiations will be captured by the crystals 20 and 21 at terminal energies within a predictable range, and thus the upper trigger level of each of the two discriminators 26 and 27 can be set at a level such as to eliminate those pulses in signals 24 and 25 having amplitudes corresponding to the terminal energies of unwanted radiations detected by the crystals 20 and 21 but originating from a source other than the marker 19. Similarly, the photomultiplier tubes 22 and 23 and other portions of the depicted cricuitry will have a tendency to generate noise pulses of relatively lower amplitudes, and thus the lower trigger levels of the two discriminators 26 and 27 may be set at a level to eliminate pulses from signals 24 and 25 which are attributable to this source.

The particular trigger levels which are selected for purposes of the present invention will, of course, depend to some extent on the identity of the daughter product which forms the marker 19. In those instances where the daughter product is barium-137M, however, and where the crystals 20 and 21 are composed of a material such as sodium iodide or cesium iodide, it has been found especially useful for present purposes to set the lower trigger level to eliminate all pulses having amplitudes of less than about 450 Kilovolts, and the upper trigger level to eliminate all pulses having amplitudes greater than about 800 Kilovolts. The output signals 28 and 29 will be composed of pulses of constant amplitude, of course, but each pulse in signal 28 will correspond to an input pulse in signal 24 having an amplitude of between 450–800 Kilovolts. Similarly, each output pulse in signal 29 will correspond to an input pulse in signal 25 having an amplitude of between 450–800 Kilovolts.

Referring again to FIG. 3, it will be seen that the output signal 28 may be applied to one input of an AND gate 30 or other switching device, and the other output signal 29 may similarly be applied to one output of another AND gate 31 or other switching device. In addition, a clock 32 or other signal source may be included to produce gating pulses 33 of suitable duration and frequency which are applied to the other inputs of the two AND gates 30 and 31. The output signal 34 from the first AND gate 30, which is applied to the input of a BCD counter 36, is therefore composed of those pulses in signal 28 which are generated during the appearance of the gating signal 33. Similarly, the output signal 35 from the second AND gate 31, which is applied to the input of a second BCD counter 37, is similarly composed of those pulses in signal 29 which appear in coincidence with the gating signal 33.

The purpose of the BCD counter 36 is to count the pulses arriving in signal 34, as will hereinafter be explained, just as the purpose of the other BCD counter 37 is to count the pulses arriving in signal 35. Accordingly, the gating signal 33 which is used to open the two AND gates 30 and 31 may conveniently be used to reset both counters 36 and 37. In addition, the two BCD counters 36 and 37 are preferably provided with presets 38 and 39, respectively, which may be of conventional thumb-wheel design. Thus, the two counters 36 and 37 will generate output pulses 40 and 41 upon accumulating pulses in number corresponding to the values established by the presets 38 and 39.

Referring again to FIG. 2, it will be seen that the pulses 40 and 41 may be applied to the inputs of a suitable timing circuit which may include a conventional bistable multivibrator 42 having its output signal 43 coupled to one input of a third AND gate 44 which, in turn, has its other input connected to receive a gating signal 46 from a clock circuit 45. The output signal 47 from the AND gate 44 may conveniently be coupled to another BCD counter 48 which, in turn, may be interconnected with another preset 49.

In practicing the present invention, it may be assumed that the three BCD counters 36, 37 and 48 are set at zero. It will be apparent that the circuitry depicted in FIG. 3 will automatically reset the first two counters 36 and 37 after each measurement, and thus other means may be conveniently used to reset the third counter 48, such as closure of the switch 87 depicted in FIG. 2.

It will be apparent from FIG. 3 that when the marker 19 approaches or reaches point D along the pipeline 2, radiations emanating from the marker 19 will impinge upon and create scintillations of light in the first crystal 20. The purpose of the photomultiplier tube 22 is to generate a pulse for each such scintillation and to provide such pulse with an amplitude functionally related to the intensity of the scintillation. The intensity of the scintillation will, of course, be functionally related to the terminal energy of the corresponding radiation, and thus the pulses in signal 24 will correspond in number and amplitude to the number and terminal energies of the radiations impinging on the crystal 20.

What is desired, of course, is to measure the time required for the marker 19 to travel between points D and DD along the pipeline 2, and thus it is a feature of the present invention to start and stop the measurement at functionally comparative instants. Since the configuration of the marker 19 tends to change as it travels along the pipeline 2, it is preferable that the time measurement begin and terminate with the first arrival of the marker 19 at points D and DD, and thus it is necessary to register such arrival on the basis of a minimum number of counts. On the other hand, it is also necessary to make the system non-responsive to bombardment of the crystals 20 and 21 by random radiations from the environment. Accordingly, each gating pulse 33 is preferably long enough to accommodate the occurrence of enough radiations if the marker 19 has actually arrived at either point D or DD, but not long enough to register any signals of spurious origin.

It will be apparent that the AND gate 30 will open only when it receives a gating pulse 33 from the clock 32. During such interval, however, pulses from signal 28 will be accepted by the AND gate 30 and transmitted as pulses to the BCD counter 36. Thus, some pulses 34 will enter the BCD counter 36 even when the marker 19 is not near or at point D. The preset 38 will contain a value such as 500, however, and if less than 500 pulses from signal 34 enter the BCD counter 36 after the occurrence of a gating pulse 33, nothing will happen and the next successive gating pulse 33 will reset the counter 36 to zero. If as many as 500 pulses from signal 34 enter the BCD counter 36 during this interval, however, the counter 36 will generate the start or turn-on signal 40, and the multivibrator 42 will, in turn, begin generating the gating signal 43.

When the gating signal 43 appears, the AND gate 44 will now accept timing pulses 46 from the clock 45 and will supply corresponding pulses 47 to the third BCD counter 48. Once the first BCD counter 36 has registered the first arrival of the marker 19, it will, of course, continue to register counts as the marker 19 passes point D. The multivibrator 42 continues to generate its output signal 43 without interruption, however, regardless of the additional pulses 34 being counted by the BCD counter 36, and regardless of the fact that such pulses 34 will decline to less than the requisite 500, as the marker 19 moves away from point D toward point DD on the pipeline 2.

When the marker nears point DD, however, its first arrival at that location will be similarly registered by the fact that 500 or more pulses 35 will arrive at the second BCD counter 37 before the arrival of the next succeeding reset or gating pulse 33 from the clock 32. When this occurs, the second BCD counter 37 will generate the stop or turn-off signal 41, and this will return the multivibrator 42 to its former state and discontinue its gating signal 43. The AND gate 44 will now stop accepting pulses 46, and the accumulated count then in the BCD counter 48 will, accordingly, be a direct digital representation of both the velocity and the flow rate of the gas or other substances being transmitted by the pipeline 2.

The turn-on signal 40 from the first BCD counter 36 may be employed to reset the third BCD counter 48, or this function may be performed in other ways. In addition, the count accumulated in the third BCD counter 48, which represents flow velocity, may be applied to or coordinated with the operation of a suitable multiplying means 49, or the like, for deriving an indication of the flow rate of the material being carried by the pipeline 2.

Although detailed reference has been made to the flange portions of the apparatus depicted in FIGS. 1 and 2, it should be noted that these components are not essential to the broader concept of the invention, and many different coupling devices are suitable for these purposes. In particular, it is especially conventional to employ screw-thread connections for all pipe fittings of relatively small diameter.

It should also be noted that although the use of two or more detectors, as depicted in FIG. 3, is especially useful in deriving measurements on the basis of the first arrival of the marker 19, an accurate timing measurement can also be derived on the basis of the distance between points I and D along the pipeline if the timer 42 is started by the release of the compressed spring 62 and the discharge of the marker 19 into the pipeline 2. In such an arrangement, the measurement circuitry will preferably first be calibrated by the use of two detectors as indicated in FIG. 3, in order to adjust the circuitry to respond to the first arrival of the marker 19 at the first detection point D on the pipeline 2. Thereafter, the second detector can be removed and the actual working measurements can be made with only the first detector. Such an arrangement is obviously cheaper to purchase and maintain, of course, and is especially desirable in those instances where the apparatus is intended to operate as a permanent part of the system sought to be monitored.

As hereinbefore explained, the clock 32 is adapted to generate a train of pulses 33 which are of equal duration. The duration of each such pulse is a function of the first arrival of the marker 19 at the two detection points D and DD, since they must be long enough to permit at least the prescribed number of gammas to be received by each of the two crystals 20 and 21, if the marker 19 has actually arrived thereat, but not long enough to produce a spurious measurement from radiations arriving from other sources. Accordingly, the length of each of the pulses in signal 33 will be a function of the valve established in each of the two presets 38 and 39. For example, if the two presets 38 and 39 are adjusted for 500 pulses, as hereinbefore suggested, each pulse in the clock signal 33 will preferably have a duration of 10 milliseconds.

It will be apparent from the foregoing that many other variations and modifications may be made in the structures and methods described herein without substantially departing from the essential concept of the present invention. Accordingly, it should be clearly understood that the forms of the invention described herein and depicted in the accompanying drawings are exemplary only and are not intended as limitations in the scope of the present invention.

What is claimed is:

1. A system for measuring the flow characteristics of a material moving in a pipeline or the like, comprising
   an elongate housing having a discharge port at one end for communication with the interior of said pipeline,
   a tubular member positioned outside of said pipeline and having one end connected to said housing for communication with the interior of said housing,
   a cylindrical member disposed in stoppering fashion in the end of said tubular member adjacent the interior of said housing,
   a quantity of radioactive material disposed in said cylindrical member and composed of a mixture of a discrete quantity of an isotope having a relatively long half-life and decaying to form a daughter product having a relatively short half-life and a discrete quantity of a granulated non-radioactive material in ion exchange relationship with said isotope and not with said daughter product,
   a quantity of a reagent material capable of permeating said cylindrical member and dissolving daughter product accumulated therein and not capable of dissolving any significant amount of said granulated non-radioactive material,
   means interconnected with said tubular member for urging a discrete portion of said reagent material through said cylindrical member into said housing,
   ejection means for said dispensing said urged portion of reagent material from said housing into the interior of said pipeline, and
   detection means externally spaced along said pipeline from said housing for sensing the presence of said discharged portion of reagent material and for deriving therefrom a functional indication of fluid flow in said pipeline.

2. The system described in claim 1, wherein said granulated non-radioactive material in a resin of ammonium hexacyanocobalt ferrate.

3. The system described in claim 1, wherein said granulated non-radioactive material in a resin of potassium hexacyanocobalt ferrate.

4. The system described in claim 1, wherein said detection means includes
   a first radiation detector disposed at a first preselected location along said pipeline for detecting the arrival of said dispensed daughter product thereat, and
   a second radiation detector disposed at a second preselected location along said pipeline for detecting the arrival of said dispensed daughter product thereat.

5. The system described in claim 4, wherein said detection means further includes
   timing means responsive to said radiation detectors for providing a digital measurement of the period during which said dispensed daughter product travels between said first and second locations in said pipeline.

6. The system described in claim 5, wherein said timing means further derives said measurement on the basis of the period between the first arrival of said dispensed daughter product at said first location and the first arrival of said dispensed daughter product thereafter at said second location.

7. The system described in claim 6, wherein said detectors and timing means comprise
   a first scintillation counter generating a first detection signal composed of electrical pulses having amplitudes functionally related to the terminal energies of radiations detected at said first location,
   a second scintillation counter generating a second detection signal composed of electrical pulses having amplitudes functionally related to the terminal energies of radiations detected at said second location, and
   counting means responsive to said detection signals for making a time-dependent pulse count determinative of the first arrival of said dispensed daughter product at said first and second locations.

8. The system described in claim 7, wherein said counting means includes
   a first pulse counter for generating a first control signal in response to a preselected number of pulses in said first detection signal,
   a second pulse counter for generating a second control signal in response to a preselected number of pulses in said second detection signal,
   gating means for admitting said first and second detection signals to said first and second counters respectively during preselected time intervals, and
   digital timing means responsive to said control signals.

9. The system described in claim 8, wherein said gating means includes
   a clock means for generating a train of discrete time-dependent gating signals,
   a first pulse gate for admitting pulses from said first scintillation counter to said first pulse counter during each of said gating signals, and
   a second pulse gate for admitting pulses from said second scintillation counter to said second pulse counter during each of said gating signals.

10. The system described in claim 9, wherein said first and second pulse counters are also reset by each of said gating signals.

11. The system described in claim 10, further including discriminating means for restricting said pulses counted by said first and second counters to those pulses having amplitudes functionally representative of the terminal energies of radiations emanating from said dispensed daughter product.

12. A method of determining the flow characteristics of a material moving in a pipeline or the like, comprising
   establishing at a location exterior of said pipeline a discrete quantity of a mixture of an unstable isotope having a relatively long half-life and decaying to form a daughter product having a relatively short half-life and a granulated non-radioactive substance in ion exchange relationship with said isotope and not said daughter product,
   separating said daughter product from said mixture,
   injecting said separated daughter product into the interior of said pipeline and into the material moving therein at a first longitudinal location,
   detecting radiations emanating from said injected daughter product at a second longitudinal location exterior of said pipeline and spaced downstream of said first location,
   detecting radiations emanating from said injected daughter product at a third longitudinal location exterior of said pipeline and spaced downstream of said second location,
   making a time-dependent count of the radiations detected at each of said second and third locations as a function of the first arrival of said radioactive marker material at said locations, and
   making a determination of the flow velocity of material in said pipeline as a function of the time interval between said first arrivals of said marker material at said second and third locations.

13. The method described in claim 12, wherein said separated daughter product is injected to form a relatively discrete quantity of radioactive marker material flowing relatively cohesively in said pipeline between said first and second longitudinal locations.

* * * * *